(12) United States Patent
Yang (10) Patent No.: US 11,515,627 B2
(45) Date of Patent: Nov. 29, 2022

(54) ANTENNA ASSEMBLIES, TERMINAL DEVICES, AND METHODS FOR IMPROVING RADIATION PERFORMANCE OF ANTENNA

(71) Applicant: GUANGDONG OPPO MOBILE TELECOMMUNICATIONS CORP., LTD., Guangdong (CN)

(72) Inventor: Huai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 36 days.

(21) Appl. No.: 16/843,336

(22) Filed: Apr. 8, 2020

(65) Prior Publication Data

US 2020/0235468 A1 Jul. 23, 2020

Related U.S. Application Data

(63) Continuation of application No. PCT/CN2018/116728, filed on Nov. 21, 2018.

(30) Foreign Application Priority Data

Nov. 23, 2017 (CN) .......................... 201711200495.2

(51) Int. Cl.
*G06F 1/16* (2006.01)
*H01Q 1/50* (2006.01)
(Continued)

(52) U.S. Cl.
CPC .............. *H01Q 1/50* (2013.01); *H01Q 1/243* (2013.01); *H01Q 3/28* (2013.01)

(58) Field of Classification Search
CPC ............ H01Q 1/50; H01Q 1/243; H01Q 3/28; H01Q 1/2266; H01Q 1/242; H04M 1/026; G06F 1/1698
See application file for complete search history.

(56) References Cited

U.S. PATENT DOCUMENTS 6,211,830 B1 * 4/2001 Monma .................. H01Q 1/242
343/702
6,985,113 B2 * 1/2006 Nishimura ............. H01Q 1/245
343/700 MS
(Continued)

FOREIGN PATENT DOCUMENTS

CN 103428314 A 12/2013
CN 103682680 A 3/2014
(Continued)

OTHER PUBLICATIONS

English translation of OA for CN application 201711200495.2 dated May 22, 2019.
(Continued)

*Primary Examiner* — Hai V Tran
*Assistant Examiner* — Bamidele A Jegede
(74) *Attorney, Agent, or Firm* — Young Basile Hanlon & MacFarlane, P.C.

(57) ABSTRACT

An antenna assembly, a terminal device having the antenna assembly, and a method for improving a radiation performance of an antenna are provided. The terminal device includes an antenna assembly, and a controller. The antenna assembly comprises an antenna, a first adjusting unit, a second adjusting unit, and an antenna switch; the controller is configured to control, based on a current working power of the antenna, the antenna switch to select one of the first adjusting unit and the second adjusting unit to be in an enabled state, so that a radiation direction of the antenna can be adjusted by the selected adjusting unit to a radiation direction formed based on the selected adjusting unit.

19 Claims, 5 Drawing Sheets

(51) Int. Cl.
*H01Q 1/24* (2006.01)
*H01Q 3/28* (2006.01)

(56) References Cited

U.S. PATENT DOCUMENTS

| | | | |
|---|---|---|---|
| 7,110,719 B2 | 9/2006 | Horibe et al. | |
| 7,821,470 B2* | 10/2010 | Azhari | H01Q 1/243 343/846 |
| 9,184,494 B1* | 11/2015 | Liu | H01Q 1/38 |
| 9,407,338 B2 | 8/2016 | Alexopoulos et al. | |
| 9,819,077 B1* | 11/2017 | Desclos | H01Q 21/30 |
| 2003/0142022 A1* | 7/2003 | Ollikainen | H01Q 9/0442 343/702 |
| 2004/0043738 A1* | 3/2004 | Horibe | H04B 1/38 455/269 |
| 2005/0239519 A1* | 10/2005 | Saitou | H01Q 3/247 455/575.1 |
| 2005/0280586 A1* | 12/2005 | Bit-Babik | H01Q 9/0421 343/702 |
| 2006/0066492 A1* | 3/2006 | Aritake | H01Q 11/08 343/702 |
| 2006/0281423 A1* | 12/2006 | Caimi | H01Q 9/045 455/121 |
| 2006/0293097 A1* | 12/2006 | Shimizu | H04B 1/3805 455/193.1 |
| 2007/0139276 A1* | 6/2007 | Svigelj | H01Q 1/38 343/700 MS |
| 2009/0197638 A1* | 8/2009 | Park | H04B 1/18 455/553.1 |
| 2010/0013730 A1* | 1/2010 | Azhari | H01Q 9/0421 343/848 |
| 2011/0148723 A1* | 6/2011 | Bengtsson | H01Q 9/42 343/745 |
| 2012/0013511 A1* | 1/2012 | Sumi | H01Q 1/243 343/702 |
| 2012/0056795 A1* | 3/2012 | Nagumo | H04B 1/0053 343/787 |
| 2012/0133571 A1* | 5/2012 | Collins | H01Q 1/242 343/860 |
| 2012/0162025 A1* | 6/2012 | Ohno | H01Q 3/00 343/702 |
| 2012/0329407 A1* | 12/2012 | Rousu | H01Q 3/2605 455/90.2 |
| 2013/0038494 A1* | 2/2013 | Kuonanoja | H01Q 9/42 343/746 |
| 2013/0099996 A1* | 4/2013 | Tseng | H01Q 5/371 343/876 |
| 2013/0241784 A1* | 9/2013 | Wong | H01Q 7/00 343/749 |
| 2013/0271342 A1* | 10/2013 | Shen | H04B 1/18 343/861 |
| 2014/0218243 A1* | 8/2014 | Wong | H01Q 1/50 343/700 MS |
| 2014/0225680 A1* | 8/2014 | Fujiwara | H03F 3/189 333/133 |
| 2014/0285378 A1* | 9/2014 | Hong | H01Q 3/34 342/368 |
| 2014/0320359 A1* | 10/2014 | Wong | H01Q 9/42 343/749 |
| 2015/0002348 A1* | 1/2015 | Wong | H01Q 1/48 343/724 |
| 2015/0109172 A1* | 4/2015 | Iijima | H01Q 1/273 343/702 |
| 2015/0180124 A1* | 6/2015 | Chen | H01Q 9/0442 343/745 |
| 2015/0188223 A1* | 7/2015 | Chang | H01Q 5/371 343/722 |
| 2015/0188224 A1* | 7/2015 | Chang | H01Q 5/328 343/724 |
| 2015/0340769 A1* | 11/2015 | Desclos | H01Q 5/335 343/745 |
| 2015/0365065 A1* | 12/2015 | Higaki | H03H 7/40 343/861 |
| 2016/0043468 A1* | 2/2016 | Onaka | H01Q 1/243 343/750 |
| 2016/0241319 A1* | 8/2016 | Kim | H04B 7/0834 |
| 2016/0359231 A1* | 12/2016 | Yang | H01Q 1/48 |
| 2017/0069958 A1* | 3/2017 | Ko | H01Q 1/38 |
| 2017/0279185 A1* | 9/2017 | Hung | H01Q 9/0442 |
| 2017/0294709 A1* | 10/2017 | Xue | H01Q 5/364 |
| 2017/0324147 A1* | 11/2017 | Lee | H01Q 1/273 |
| 2017/0365912 A1* | 12/2017 | Su | H01Q 1/243 |
| 2018/0026363 A1* | 1/2018 | Bevelacqua | H01Q 9/42 343/700 MS |

FOREIGN PATENT DOCUMENTS

| | | | | |
|---|---|---|---|---|
| CN | 104468942 | A | 3/2015 | |
| CN | 105048092 | A | 11/2015 | |
| CN | 105071041 | A | 11/2015 | |
| CN | 204834873 | U | 12/2015 | |
| CN | 105827334 | A | 8/2016 | |
| CN | 106159461 | A | 11/2016 | |
| CN | 106450757 | A | 2/2017 | |
| CN | 106785449 | A | 5/2017 | |
| CN | 107278195 | A | 10/2017 | |
| CN | 107967026 | A | 4/2018 | |
| KR | 101473717 | B1 * | 4/2014 | H01Q 5/00 |
| KR | 20160003482 | A * | 7/2014 | H01Q 1/24 |

OTHER PUBLICATIONS

English translation of ISR for PCT application PCT/CN2018/116728 dated Feb. 22, 2019.
Extended European Search Report for EP application 18882230.8 dated Sep. 23, 2020.
Communication pursuant to Article 94(3) EPC for EP Application 18882230.8 dated Nov. 19, 2021. (6 pages).
Indian Examination Report for IN Application 202017010981 dated Aug. 26, 2021. (6 pages).

* cited by examiner

ANTENNA ASSEMBLIES, TERMINAL DEVICES, AND METHODS FOR IMPROVING RADIATION PERFORMANCE OF ANTENNA

CROSS-REFERENCE TO RELATED APPLICATION(S)

This application is a continuation application of International Patent Application No. PCT/CN2018/116728, filed on Nov. 21, 2018, which claims priority to and benefits of Chinese Patent Application No. 201711200495.2, filed on Nov. 23, 2017, the entire content of both of which are incorporated herein by reference in their entireties.

TECHNICAL FIELD

The disclosure relates to antenna structures of electronic devices, and more particularly, to an antenna assembly capable of improving a radiation performance of an antenna, a terminal device having the antenna assembly, and a method for improving a radiation performance of an antenna.

BACKGROUND

Radiated spurious emission, as a compulsory certification indicator for electronic devices, is the most complex and intractable problem in all certifications. Especially for GSM (Global System for Mobile Communications) bands, because a power of the GSM bands is particularly high, it is easy to excite strong energy in an instant, thereby causing radiated spurious harmonics to exceed standards. In actual uses, it is mainly encountered that the third harmonic of GSM900 exceeds standards, and the second or third harmonic of GSM1800 exceeds standards.

For a radio frequency signal, a transmitted signal may include an available signal (GSM900), but also include a second harmonic (1800 GHz)/a third harmonic (2700 GHz). The third harmonic may exceed standards for most of the actual uses. Also, for a resonant antenna, there may be a fundamental wave, a second resonance/a third resonance. When energy of the third harmonic of the radio frequency signal reaches the position of the third resonance of the antenna, the useless harmonic energy will be radiated out, resulting in excess radiated spurious emission.

With the advent of the full-screen era of electronic devices such as mobile phones, many non-linear devices may be placed at the top and bottom positions of electronic devices, and are getting closer to antennas that are also placed at the top and bottom positions. These non-linear devices often lead to the excess radiated spurious emission of the antennas.

SUMMARY

In an aspect, a terminal device is provided. The terminal device includes an antenna assembly, and a controller. The antenna assembly includes an antenna, a first adjusting unit, a second adjusting unit, and an antenna switch. The controller is configured to, based on a current working power of the antenna, control the antenna switch to select one of the first adjusting unit and the second adjusting unit to be in an enabled state, such that a radiation direction of the antenna is adjusted by the selected adjusting unit to a radiation direction formed based on the selected adjusting unit.

In another aspect, an antenna assembly is provided. The antenna assembly includes an antenna, a first adjusting unit, a second adjusting unit, and an antenna switch. The antenna switch is configured to select one of the first adjusting unit and the second adjusting unit to be in an enabled state, such that a radiation direction of the antenna is adjusted by the selected adjusting unit to a radiation direction formed based on the selected adjusting unit.

In still another aspect, a method for improving a radiation performance of an antenna is provided. The method is applied to a terminal device. The method includes: determine a type of a working power of the antenna; and adjusting a radiation direction of the antenna based on the type of the working power of the antenna.

BRIEF DESCRIPTION OF DRAWINGS

In order to clearly illustrate technical solutions in embodiments of the disclosure, a brief description of drawings used in embodiments is given below. Obviously, the drawings in the following descriptions are only part embodiments of the present disclosure, and for those skilled in the art, other drawings can be acquired according to these drawings without creative labor.

DETAILED DESCRIPTION

Technical solutions in embodiments of the disclosure will be clearly and completely described with reference to drawings in the embodiments of the disclosure. Obviously, the described embodiments are only a part of the embodiments of the disclosure, but not all of the embodiments. Based on the embodiments in the disclosure, all other embodiments acquired by those skilled in the art without creative labor belong to the scope of the disclosure.

In the description of the embodiments of the disclosure, it should be understood that orientations or position relationships indicated by terms "thickness" and the like are based on orientations or position relationships illustrated in the drawings, which is only for the convenience of describing the disclosure and simplifying the description, rather than implying that devices or elements referred to or indicated must have specific orientations, constructed by specific orientations, and operate through specific orientations.

Therefore, it cannot be understood as a limitation on the disclosure. The first and second are only for the purpose of distinguishing, and do not refer to a specific object.

Figure 1:
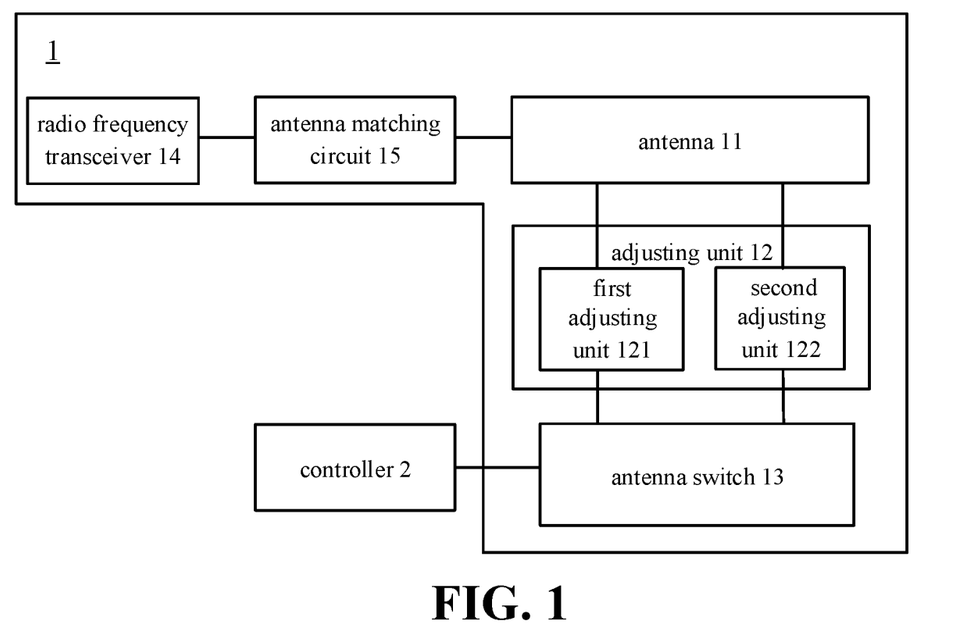
FIG. 1 is a schematic diagram of a terminal device according to an embodiment of the disclosure.

With reference to FIG. 1, as a schematic diagram of a terminal device 100, some elements of the terminal device 100 may be illustrated.

As illustrated in FIG. 1, the terminal device 100 includes an antenna assembly 1, and a controller 2. The controller 2 is configured to change an antenna radiation direction of the antenna assembly based on a power of the antenna assembly 1, thereby ensuring that a communication quality and a radiated spurious emission, of the antenna assembly, both meet requirements.

The antenna assembly 1 includes an antenna 11, an adjusting unit 12, and an antenna switch 13. The adjusting unit 12 includes a first adjusting unit 121 and a second adjusting unit 122. The first adjusting unit 121 and the second adjusting unit 122 are coupled between the antenna 11 and the antenna switch 13. The first adjusting unit 121 is configured to adjust a radiation direction of the antenna 11 to a first radiation direction. The second adjusting unit 122 is configured to adjust a radiation direction of the antenna 11 to a second radiation direction. The controller 2 is electrically coupled to the antenna switch 13.

The antenna switch 13 is configured to select one of the first adjusting unit 121 and the second adjusting unit 122 to be in an enabled state based on a current working power of the antenna 11 under a control of the controller 2. Therefore, when the first adjusting unit 121 is enabled to work, the radiation direction of the antenna 11 is set to the first radiation direction. When the second adjusting unit 122 is enabled to work, the radiation direction of the antenna 11 is set to the second radiation direction.

That is, the controller 2 controls the antenna switch 13 to select one of the first adjusting unit 121 and the second adjusting unit 122 to be in the enabled state based on the current working power of the antenna 11, to adjusted the radiation direction of the antenna to a corresponding radiation direction.

Therefore, in the disclosure, by adjusting the radiation direction of the antenna 11 based on the current working power of the antenna 11 and by considering the working power and the radiation direction in a balanced manner, it may ensure that requirements of the communication quality may be meet and the radiated spurious emission does not exceed standards when the antenna 11 communicates with the current radiation direction and working power of the antenna.

Figure 6:
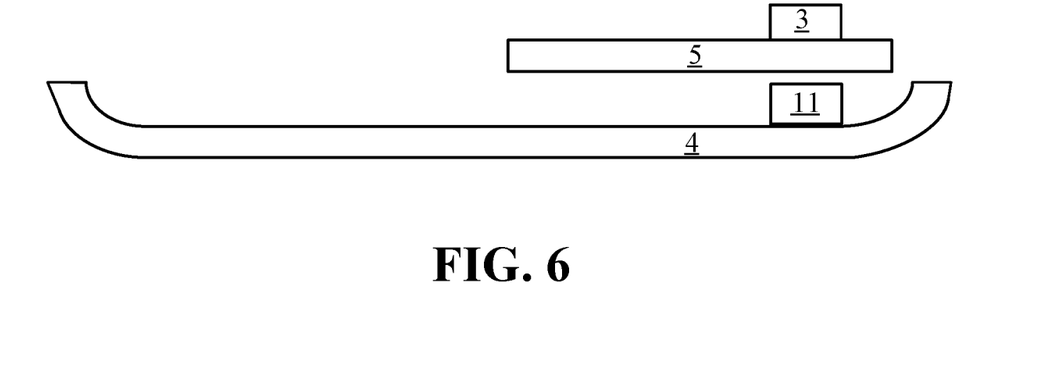
FIG. 6 is a schematic side view of an internal structure of a terminal device according to an embodiment of the disclosure.
Figure 8:
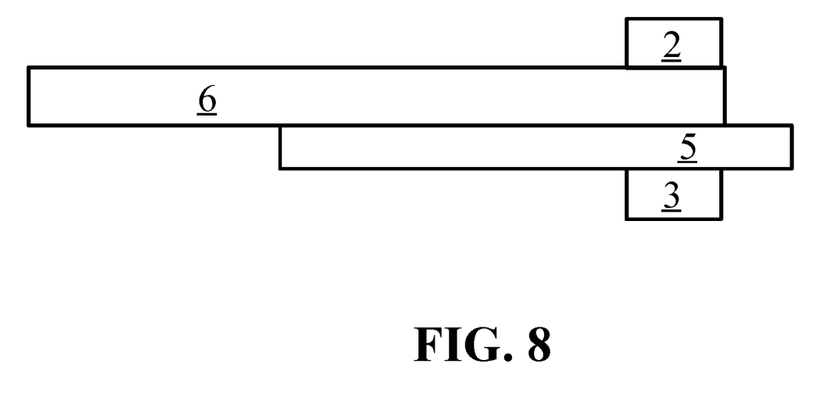
FIG. 8 is a schematic diagram of an antenna in a terminal device, disposed on a middle frame, according to an embodiment of the disclosure.

In detail, in some embodiments, the first radiation direction is an optimal radiation direction of the antenna 11. The second radiation direction is a direction deviating from the functional device 3 (as illustrated in FIG. 6 and FIG. 8). That is, the second radiation direction is a radiation direction through which transmission paths of antenna signals does not pass through any functional device 3 when the antenna 11 radiates the antenna signals in the second radiation direction.

The controller 2 controls the antenna switch 13 to select one of the first adjusting unit 121 and the second adjusting unit 122 to be in the enabled state based on the current working power of the antenna 11, which includes that: the controller 2 determines a type of the working power of the antenna 11; the controller 2 controls the antenna switch 13 to select the first adjusting unit 121 to be in the enabled state under a case that the working power of the antenna 11 is a first type of power, such that the radiation direction of the antenna 11 is adjusted by the first adjusting unit 121 to the first radiation direction being the optimal radiation direction; and the controller 2 controls the antenna switch 13 to select the second adjusting unit 122 to be in the enabled state under a case that the working power of the antenna 11 is a second type of power, such that the radiation direction of the antenna 11 is adjusted by the second adjusting unit 122 to the second radiation direction deviating from the functional device 3.

A power value of the first type of power is smaller than a power value of the second type of power. In some embodiments, the first type of power is a power with a value less than or equal to a first preset value, and the second type of power is a power with a value greater than a second preset value. The second preset value is greater than or equal to the first preset value.

Therefore, in the disclosure, when the current working power of the antenna 11 is smaller, i.e., the first type of power, the radiation direction of the antenna 11 is controlled to be the optimal radiation direction. Generally, due to layout requirements of the terminal device 100, the functional device 3 may be provided in the optimal radiation direction of the antenna 11, such that the antenna 11 directly radiates through the functional device 3 and thus causes the coupling of the functional device 3 to generate coupling signals. However, due to the smaller working power of the antenna 11 at this moment, the energy of the coupling signals generated by the coupling of the functional device 3 may be also smaller, which will not cause that the radiated spurious emission exceed standards. In addition, since the radiation direction of the antenna 11 is the optimal radiation direction at this moment, the communication quality may be ensured.

When the working power of the antenna 11 is larger, i.e., the second type of power, at this moment, the radiation direction of the antenna 11 is controlled to the second radiation direction deviating from the functional device 3, thereby preventing the antenna 11 from radiating the functional device 3 directly to cause coupling signals, and reducing the radiated spurious emission of the antenna 11. At the same time, because the working power of the antenna 11 is larger, even if the radiation direction is not the optimal radiation direction at this moment, the communication quality may be ensured to meet the requirements.

Figure 2:
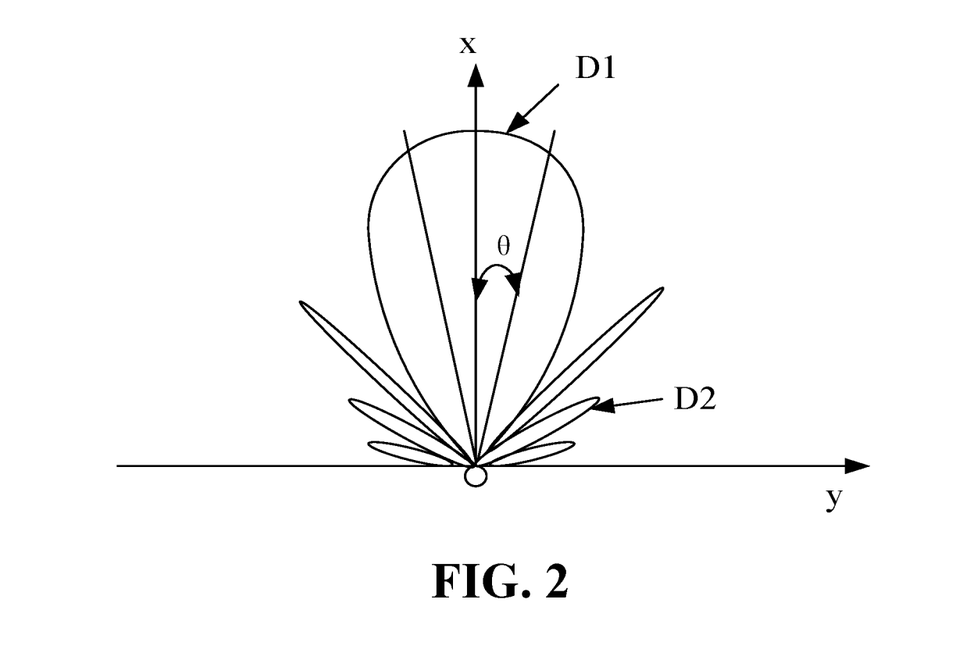
FIG. 2 is a schematic diagram of radiant energy when an antenna radiates in various directions according to an embodiment of the disclosure.

With reference to FIG. 2 together, a schematic diagram of radiated energy when the antenna 11 radiates in various directions may be illustrated. FIG. 2 is a schematic diagram of radiant energy when the antenna radiates in various directions under the same power. As illustrated in FIG. 2, when the antenna 11 radiates/transmits the antenna signal in the first radiation direction D1 being the optimal radiation direction, the radiation energy is the highest. When the antenna 11 radiates the antenna signal in other directions, for example, the second radiation direction D2, the radiation energy is significantly reduced. Therefore, when the working power of the antenna 11 is smaller but the radiation direction is the optimal radiation direction, the energy of the coupling signal generated by the functional device 3 is low, but the radiation energy of the antenna signal is high, thereby ensuring the communication quality and avoiding the excess radiated spurious emission. When the working power of the antenna 11 is larger, the radiation direction deviates from the functional device 3, and it also deviates from the optimal radiation direction. As described above, the coupling signal caused by the antenna 11 directly radiating the functional device 3 is avoided, and the radiated spurious emission is reduced. At the same time, because the working power of the antenna 11 is larger, even if the radiation direction is not the optimal radiation direction at this moment, the communication quality may be ensured to meet the requirements.

The first radiation direction D1 may be a direction within a preset angle range, and is not limited to one angle direction. For example, as illustrated in FIG. 2, the first radiation direction D1 may be a direction with a range of a deviation angle θ of the direction x. In addition, as illustrated in FIG. 2, when the deviation angle of the radiation direction of the antenna 11 from the first radiation direction D1 is larger, the radiation energy of the antenna 11 is lower.

When the terminal device 100 is in different communication states, the working powers of the antenna 11 may be different. The controller 2 determines whether the working power of the antenna 11 is the first type of power or the second type of power by detecting the communication state of the terminal device 100. For example, when the terminal device 100 is in a call state, the working power of the antenna 11 is generally the lower first type of power. When the terminal device 100 is in a call or traffic connection establishment or network receiving stage, the working power of the antenna 11 is generally the higher second type of power. Therefore, under a case determining that the terminal device 100 is currently in the call state, the controller 2 determines that the working power of the antenna 11 is the first type of power. Under a case determining that the terminal device 100 is currently in the call or traffic connection establishment or network receiving stage, the controller 2 determines that the working power of the antenna 11 is the second type of power.

In other embodiments, the controller 2 acquires the working power of the antenna 11 and determines that the working power of the antenna 11 is the first type of power under a case that the working power of the antenna 11 is smaller than a first preset value, and determines that the working power of the antenna 11 is the second type of power under a case that the working power of the antenna 11 is greater than a second preset value.

As illustrated in FIG. 1, the antenna assembly 1 further includes a radio frequency transceiver 14 and an antenna matching circuit 15. The radio frequency transceiver 14 is coupled to the antenna 11 through the antenna matching circuit 15. The antenna matching circuit 15 is configured to match impedance between the radio frequency transceiver 14 and the antenna 11. The radio frequency transceiver 14 is configured to transmit and receive antenna signals in multiple frequency bands.

In some embodiments, the controller 2 acquires the working power of the antenna 11 from the radio frequency transceiver 14.

In some embodiments, the first adjusting unit 121 and the second adjusting unit 122 may adjust the radiation direction of the antenna 11 by adjusting an antenna parameter of the antenna 11.

The antenna parameter may include an antenna feed length and an antenna area. When the antenna length, the antenna area, and the like of the antenna 11 change, the radiation direction of the antenna 11 changes accordingly.

Figure 3:
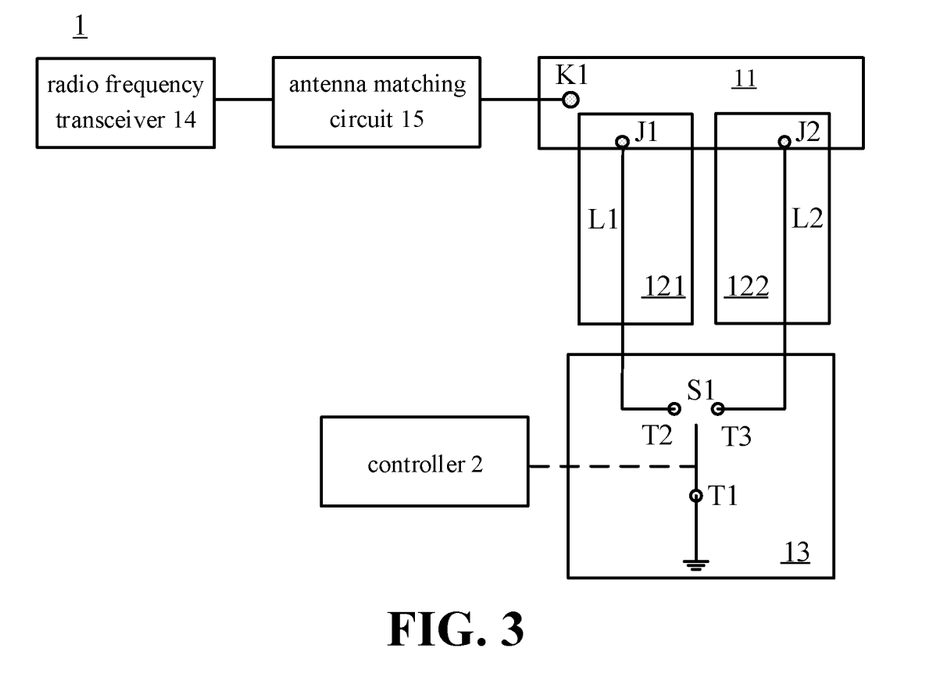
FIG. 3 is a schematic diagram of an antenna assembly according to an embodiment of the disclosure.

With reference to FIG. 3 together, a detailed structural diagram of the antenna assembly 1 according to the embodiment is illustrated. As illustrated in FIG. 3, in some embodiments, the first adjusting unit 121 includes a first conductive wire L1 electrically coupled to a first position J1 of the antenna 11. The second adjusting unit 122 includes a second conductive wire L1 electrically coupled to a second position J2 of the antenna 12.

The antenna 11 further includes a feeding point K1. The feeding point K1 is coupled to the antenna matching circuit 15 as a signal feeding point.

The antenna switch 13 is coupled among the first conductive wire L1, the second conductive wire L2, and a ground. The antenna switch 13 is configured to select one of the first conductive wire L1 and the second conductive wire L2 to be grounded, i.e., select one of the first adjusting unit 121 and the second adjusting unit 122 to be in the enabled state. When the first conductive wire L1 is grounded, the antenna 11 is grounded through the first position J1. When the second conductive wire L2 is grounded, the antenna 11 is grounded through the second position J2. Therefore, grounding positions of the antenna 11 may be different, and the feeding lengths of the antenna 11 may be also different, such that the radiation direction of the antenna 11 is changed by changing the feeding length of the antenna.

As illustrated in FIG. 3, the antenna switch 13 is a single-pole double-throw switch S1. A static contact T1 of the single-pole double-throw switch S1 is grounded. A first movable contact T2 of the single-pole double-throw switch S1 is coupled to the first conductive wire L1. A second movable contact T3 of the single-pole double-throw switch S1 is coupled to the second conductive wire L2. The controller 2 selects one of the first conductive wire L1 and the second conductive wire L2 to be grounded by controlling the static contact T1 of the single-pole double-throw switch S1 to be coupled to one of the first movable contact T2 and the second movable contact T3.

The first position J1 may be designed based on that the radiation direction of the antenna 11 is the optimal radiation direction when the first position J1 is grounded. The second position J2 may be designed based on that the radiation direction of the antenna 11 is the direction deviating from the functional device 3 when the second position J2 is grounded.

Figure 4:
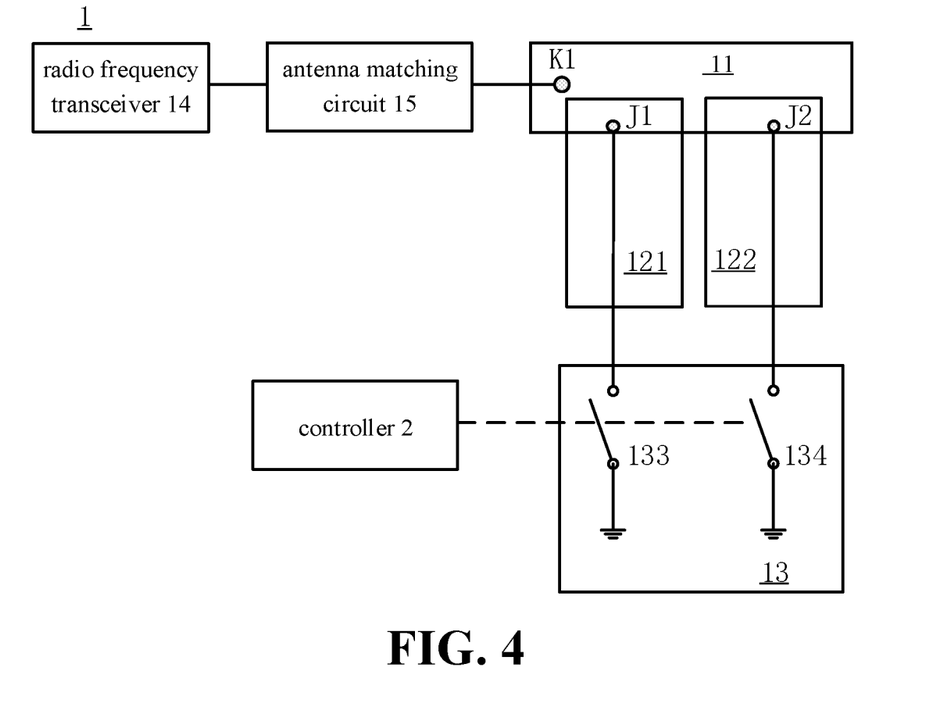
FIG. 4 is a schematic diagram of an antenna assembly according to another embodiment of the disclosure.

With reference to FIG. 4, a detailed structural diagram of the antenna assembly 1 in another embodiment is illustrated. In another embodiment, the difference from the embodiment illustrated in FIG. 3 is that the antenna switch 13 includes two single-pole single-throw switches, that is, a first single-pole single-throw switch 133 and a second single-pole single-throw switch 134. The first single-pole single-throw switch 133 is coupled between the first conductive wire L1 and the ground. The second single-pole single-throw switch 134 is coupled between the second conductive wire L2 and the ground.

The controller 2 selects one of the conductive wires L1 and L2 to be grounded by controlling one of the first single-pole single-throw switch 133 and the second single-pole single-throw switch 134 to be turned on.

Figure 5:
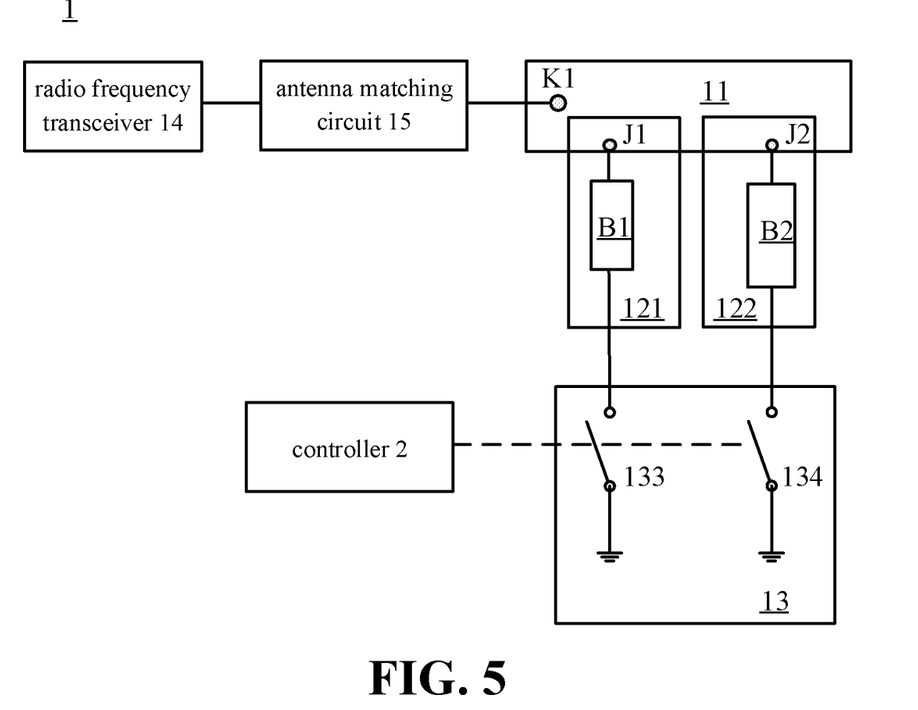
FIG. 5 is a schematic diagram of an antenna assembly according to still another embodiment of the disclosure.

With reference to FIG. 5, a detailed structural diagram of the antenna assembly 1 in still another embodiment is illustrated. In still another embodiment, the first conductive wire L1 included in the first adjusting unit 121 and electrically coupled to the first position J1 of the antenna 11 is further coupled with a first conductive portion B1. The second conductive wire L2 included in the second adjusting unit 122 and electrically coupled to the second position J2 of the antenna 11 is also coupled to the second conductive portion B2. That is, the first adjusting unit 121 includes the first conductive wire L1 electrically coupled to the first position J1 of the antenna 11 and the first conductive portion B1 coupled to the first conductive wire L1, and the second adjusting unit 122 includes the second conductive wire L2 electrically coupled to the second position J2 of the antenna 11 and the second conductive portion B2 coupled to the second conductive wire L2. An area of the first conductive portion B1 is not equal to an area of the second conductive portion B2.

The antenna switch 13 is coupled among the first conductive wire L1, the second conductive wire L2, and the ground. The antenna switch 13 is configured to select one of the first conductive wire L1 and the second conductive wire L2 to be grounded to change the grounding position and the antenna area of the antenna 11, to change the antenna feed length and the antenna area of the antenna 11.

That is, when the controller 2 controls the antenna switch 13 to select one of the first conductive wire L1 and the second conductive wire L2 to be grounded, the antenna 11 may have the different ground point and may be coupled to the conductive portion with the different area. Therefore, the antenna feed length and the antenna area of the antenna 11 may change at the same time, thereby changing the radiation direction of the antenna.

In detail, when the first conductive wire L1 is grounded, the antenna 11 is grounded through the first position J1. At the same time, the first conductive portion B1 and the antenna 11 together serve as a radiator so that the area of the antenna is the first area. When the second conductive wire L2 is grounded, the antenna 11 is grounded through the second position J2. At the same time, the second conductive portion B2 and the antenna 11 together serve as a radiator so that the area of the antenna is the second area.

The antenna 11 is made of a conductive metal material as a radiator in the antenna assembly 1 to transmit and receive antenna signals.

The first conductive wire L1 and the second conductive wire L2 are conductive metal strips. The first conductive portion B1 and the second conductive portion B2 may be attached to the first conductive wire L1 and the second conductive wire L1, respectively, and electrically coupled to the first conductive wire L1 and the second conductive wire L2, respectively.

In some embodiments, the first position J1 and the area of the first conductive portion B1 may be designed based on that the radiation direction of the antenna 11 is the optimal radiation direction when the first position J1 is grounded. The second position J2 and the area of the second conductive portion B2 may be designed based on that the radiation direction of the antenna 11 is the direction deviating from the functional device 3 when the second position J2 is grounded.

Therefore, in the disclosure, by comprehensively considering the working power and the radiation direction of the antenna 11, the communication quality and the radiated spurious emission not exceeding standards may be ensured when the antenna 11 work at different working powers.

The functional device 3 may be a non-linear functional device such as a fingerprint recognition subassembly, a sensor, a camera, a flash lamp, and a speaker. The controller 2 may be a central processing unit, a microcontroller, a single-chip microcontroller, a digital signal processor, and the like.

With reference to FIG. 6, a schematic side view of the internal structure of the terminal device 100 according to an embodiment is illustrated. The terminal device 100 further includes a rear cover 4 and a circuit board 5. The antenna 11 is disposed on an inner surface of the rear cover 4 or near the rear cover 4. The functional device 3 is disposed on the circuit board 5. The position of the functional device 3 is close to the position of the antenna 11. In some embodiments, the projection of the functional device 3 and the projection of the antenna 11 on the rear cover 4 coincide.

The aforementioned radio frequency transceiver 14 and antenna matching circuit 15 are also disposed on the circuit board 5.

Figure 7:
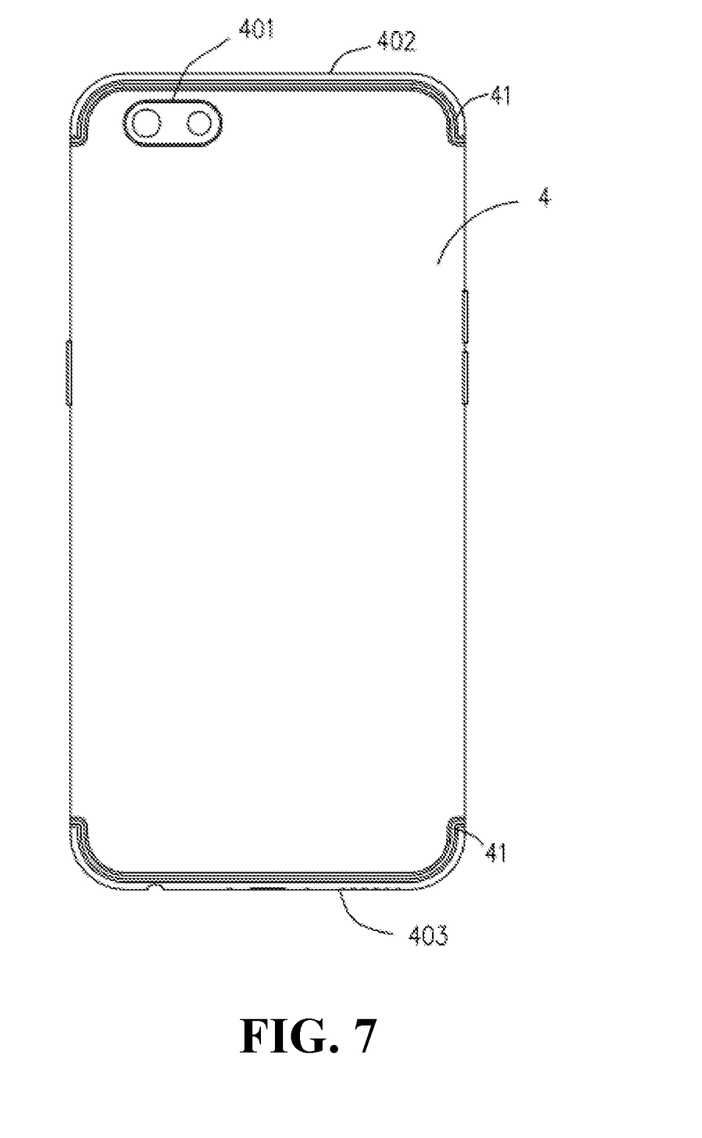
FIG. 7 is a schematic rear view of a rear cover in a terminal device according to an embodiment of the disclosure.

With reference to FIG. 7, a rear view of the terminal device 100 is illustrated. The rear cover 4 is provided with a plurality of slits 41 at the position corresponding to the antenna 11 to form a clearance area on the rear cover 4 for receiving and transmitting signals of the antenna 11. The plurality of slits 41 are parallel slits. The plurality of slits 41 are further filled with a non-metallic material such as a resin material or glue to enhance the strength of the rear cover 4.

In some embodiments, the plurality of slits 41 are micro slits. The width of the slits may be 0.05 mm, 0.3 mm, or any value from 0.05 mm to 0.3 mm. The number of the slits 41 may be 5, 10, or any number from 5 to 10. The width of the micro slits 41 is guaranteed to be a maximum of 0.05 mm, so that the micro slits 41 cannot be directly distinguished by a user and the lowest radio frequency efficiency of the rear cover 40 is guaranteed. On the contrary, the width of the micro slits 41 is guaranteed to be a maximum of 0.3 mm, so that the micro slits 41 cannot be distinguished by naked eyes of the user and the radio frequency efficiency of the rear cover 4 is improved. Similarly, the number of the micro slits 41 is controlled to a minimum of 5 to ensure the radiation performance of the rear cover 4, and the number of the micro slits 41 is controlled to a maximum of 10 to ensure the appearance of the rear cover 4.

The rear cover 4 is a metal rear cover.

As illustrated in FIG. 7, a camera hole 401 is further defined in the rear cover 4. The plurality of slits 41 are disposed between the camera hole 401 and the top edge 402 of the rear cover 40. The extending shape of the plurality of slits 41 is substantially the same as the extending shape of the top edge 402 of the rear cover 4. That is, each slot 41 at least includes one straight-line segment and two circular-arc segments connected to both ends of the straight-line segment. The camera hole 401 is a dual-camera hole for accommodating a dual-camera structure formed by two cameras. Or the camera hole 401 is a pseudo dual-camera hole for accommodating a pseudo dual-camera structure formed by a camera and a flash lamp.

In some embodiments, the antenna 11 and the circuit board 5 are disposed near the top position of the terminal device 100. The antenna 11 extends along the edge of the top of the terminal device 100. In other embodiments, the antenna device 11 and the circuit board 5 are disposed at positions corresponding to the non-display areas near the top and bottom of the terminal device 100, and the circuit board 5 is provided with the functional device 3.

In some embodiments, when the antenna 11 is also provided near the bottom of the terminal device 100, as illustrated in FIG. 7, when the antenna 11 is also provided near the bottom of the terminal device 100, the bottom edge 403 of the rear cover 4 is provided with the plurality of aforementioned slits 41 as the clearance area of the antenna 11. The shape of the plurality of slits 41 provided near the bottom edge 403 of the rear cover is similar to the extending shape of the bottom edge 403.

Obviously, when antennas are provided near the top and the bottom of the terminal device 100, each antenna 11 is coupled to a corresponding adjusting unit 12 to perform the aforementioned adjustment of the radiation direction under the control of the controller 2.

With reference to FIG. 8 together, in other embodiments, the terminal device 100 further includes a middle frame 6. The antenna 11 may be disposed on the middle frame 6. The middle frame 6 may partially extend to the position of the circuit board 5. The projection of the functional device 3 and the projection of the antenna 11 on the circuit board 5 at least partially coincide.

The circuit board 5 may be a main board of the terminal device 100.

The terminal device 100 may further include structures such as a display screen and a glass cover plate, which are not described or illustrated because they have nothing to do with the improvement of the disclosure. For example, the cross-sectional view illustrated in FIG. 7 is a schematic diagram with the structure of the display screen and the glass cover removed, and the element structure involved in the disclosure is illustrated only.

The terminal device 100 may be a mobile phone or a tablet computer. The antenna 11 is an antenna radiator with a corresponding shape and function, such as a PIFA antenna.

Figure 9:
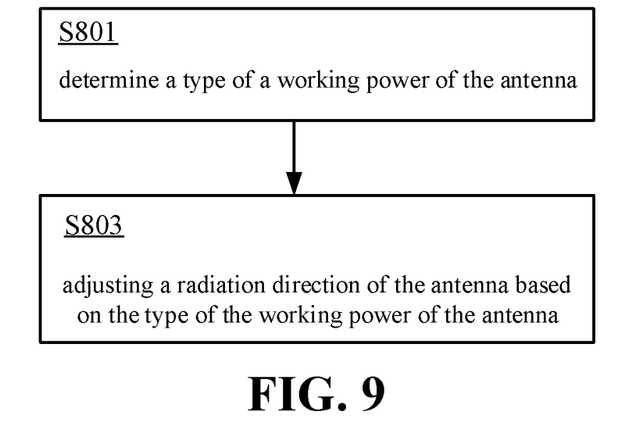
FIG. 9 is a flowchart of a method for improving a radiation performance of an antenna according to an embodiment of the present disclosure.

With reference to FIG. 9, a flowchart of a method for improving a radiation performance of an antenna according to an embodiment of the disclosure is illustrated. In some embodiments, the method is applicable to the aforementioned antenna assembly 1 and terminal device 100. The method includes the following.

A type of a working power of the antenna 11 is determined (S801). In some embodiments, the act at block S801 may include: detecting a communication state of the terminal device 100 to determine whether the working power of the antenna 11 is a first type of power or a second type of power. In other embodiments, the act at block S801 may include: acquiring the working power of the antenna 11, and determining that the working power of the antenna 11 is a first type of power under a case that the working power of the antenna 11 is compared to be smaller than a first preset value, and determining that the working power of the antenna 11 is a second type of power under a case that the working power of the antenna 11 is compared to be greater than a second preset value. The second preset value is greater than or equal to the first preset value.

A radiation direction of the antenna 11 is adjusted based on the type of the working power of the antenna 11 (S803). In some embodiments, the act at block S803 may include: under a case that the working power of the antenna is the first type of power, switching the radiation direction of the antenna to a first radiation direction as an optimal radiation direction; under a case that the working power is the second type of power, switching the radiation direction of the antenna to a second radiation direction that deviates from the functional device of the terminal device. A value of the first type of power is smaller than a value of the second type of power.

In some embodiments, the act at block S803 may include: under a case that the working power of the antenna 11 is the first type of power, selecting the first adjusting unit 121 to be in an enabled state, and adjusting the radiation direction of the antenna 11 through the first adjusting unit 121 to a first radiation direction as an optimal radiation direction; under a case that the working power of the antenna 11 is the second type of power, selecting the second adjusting unit 122 to be in an enabled state, and adjusting the radiation direction of the antenna 11 through the second adjusting unit 122 to a second radiation direction deviating from the functional device 3. A value of the first type of power is smaller than a value of the second type of power.

In some embodiments, the foregoing "selecting the first adjusting unit 121 to be in the enabled state" or "selecting the second adjusting unit 122 to be in the enabled state" includes: selecting the first adjusting unit 121 through an antenna switch to be in the enabled state or selecting the second adjusting unit 122 through an antenna switch to be in the enabled state.

In some embodiments, "adjusting the first radiation direction of the antenna 11 to the first radiation direction as the optimal radiation direction through the first adjusting unit 121" or "adjusting the first radiation direction of the antenna 11 to the second radiation direction deviating from the functional device 3 through the second adjusting unit 122" may include: adjusting an antenna parameter of the antenna 11 to a corresponding antenna parameter through the first adjusting unit 121 or the second adjusting unit 122 mentioned above, to adjust the radiation direction of the antenna 11 to the first radiation direction or the second radiation direction. The antenna parameter may be an antenna feed length, an antenna area, and the like.

With the antenna assembly, the terminal device having the antenna assembly, and the method for improving the radiation performance of the antenna, provided in the disclosure, the radiation direction of the antenna may be adjusted based on the current power of the antenna, thereby ensuring that the radiated spurious emission of the antenna does not exceed standards in the premise of ensuring a communication quality of the antenna.

The above are implementations of the embodiments of the disclosure. It should be noted that for those skilled in the art, without departing from the principle of the embodiments of the disclosure, several improvements and retouching may be made. There improvements and retouching may be also as the scope of the disclosure.

What is claimed is:

1. A terminal device, comprising:
an antenna assembly, comprising an antenna, a first adjusting unit, a second adjusting unit, and an antenna switch;
a controller, configured to, based on a current working power of the antenna, control the antenna switch to select one of the first adjusting unit and the second adjusting unit to be in an enabled state, such that a radiation direction of the antenna is adjusted by the selected adjusting unit to a radiation direction formed based on the selected adjusting unit; and
a functional device provided in an optimal radiation direction of the antenna, the controller being configured to determine a type of the working power of the antenna, and under a case that the working power of the antenna is a first type of power, to adjust the radiation direction of the antenna to a first radiation direction being the optimal radiation direction; and the controller being configured, under a case that the working power of the antenna is a second type of power, to adjust the radiation direction of the antenna to a second radiation direction deviating from the functional device, wherein a power value of the first type of power is smaller than a power value of the second type of power.

2. The terminal device of claim 1, wherein the first adjusting unit is configured to, when enabled, adjust the radiation direction of the antenna to a first radiation direction, and the second adjusting unit is configured to, when enabled, adjust the radiation direction of the antenna to a second radiation direction.

3. The terminal device of claim 2, wherein the controller is configured to control the antenna switch to select the first adjusting unit to be in the enabled state under a case that the working power of the antenna is a first type of power, and the controller is configured to control the antenna switch to select the second adjusting unit to be in the enabled state under a case that the working power of the antenna is a second type of power.

4. The terminal device of claim 3, wherein the controller is further configured to determine whether the working power of the antenna is the first type of power or the second type of power by detecting a communication state of the terminal device.

5. The terminal device of claim 3, wherein the controller is further configured to acquire the working power of the antenna, and to determine that the working power of the antenna is the first type of power under a case that the working power of the antenna is smaller than a first preset value, and to determine that the working power of the antenna is the second type of power under a case that the working power of the antenna is greater than a second preset value, in which the second preset value is greater than or equal to the first preset value.

6. The terminal device of claim 1, wherein the first adjusting unit and the second adjusting unit are configured to adjust the radiation direction of the antenna by adjusting one or more antenna parameters of the antenna, the one or more antenna parameters comprise at least one of an antenna feed length and an antenna area.

7. The terminal device of claim 6, wherein the first adjusting unit comprises a first conductive wire electrically coupled to a first position of the antenna, the second adjusting unit comprises a second conductive wire electrically coupled to a second position of the antenna, and the antenna switch is coupled among the first conductive wire, the second conductive wire and ground, and configured to select one of the first conductive wire and the second conductive wire to be grounded, to change a grounding position of the antenna and thus further change the antenna feed length of the antenna.

8. The terminal device of claim 7, wherein the antenna switch comprises a single-pole double-throw switch, a static contact of the single-pole double-throw switch is grounded, a first movable contact of the single-pole double-throw switch is coupled to the first conductive wire, a second movable contact of the single-pole double-throw switch is coupled to the second conductive wire; the controller is configured to control the static contact of the single-pole double-throw switch to be coupled to one of the first movable contact and the second movable contact, to select one of the first conductive wire and the second conductive wire to be grounded.

9. The terminal device of claim 7, wherein the antenna switch comprises a first single-pole single-throw switch and a second single-pole single-throw switch, and the first single-pole single-throw switch is coupled between the first conductive wire and the ground, and the second single-pole single-throw switch is coupled between the second conductive wire and the ground; the controller is configured to control one of the first single-pole single-throw switch and the second single-pole single-throw switch to be turned on, to select one of the first conductive wire and the second conductive wire to be grounded.

10. The terminal device of claim 6, wherein the first adjusting unit comprises a first conductive wire electrically coupled to a first position of the antenna and a first conductive portion coupled to the first conductive wire, the second adjusting unit comprises a second conductive wire electrically coupled to a second position of the antenna and a second conductive portion coupled to the second conductive wire, an area of the first conductive portion is not equal to an area of the second conductive portion, the antenna switch is coupled among the first conductive wire, the second conductive wire, and ground, and configured to select one of the first conductive wire and the second conductive wire to be grounded, to change a grounding position of the antenna and thus further change the antenna feed length of the antenna, and to change an antenna area of the antenna based on the corresponding conductive portion coupled to the corresponding conductive wire.

11. An antenna assembly, comprising:
an antenna;
a first adjusting unit;
a second adjusting unit; and
an antenna switch, configured to select one of the first adjusting unit and the second adjusting unit to be in an enabled state, such that a radiation direction of the antenna is adjusted by the selected adjusting unit to a radiation direction formed based on the selected adjusting unit,
wherein under a case that the working power of the antenna is a first type of power, the radiation direction of the antenna is adjusted to a first radiation direction being an optimal radiation direction of the antenna,
wherein under a case that the working power of the antenna is a second type of power, the radiation direction of the antenna is adjusted to a second radiation direction deviating from a functional device provided in the optimal radiation direction of the antenna, and
wherein a power value of the first type of power is smaller than a power value of the second type of power.

12. The antenna assembly of claim 11, wherein the first adjusting unit is configured to, when enabled, adjust the radiation direction of the antenna to a first radiation direction, and the second adjusting unit is configured to, when enabled, adjust the radiation direction of the antenna to a second radiation direction.

13. The antenna assembly of claim 12, wherein the antenna switch is configured to select the first adjusting unit to be in the enabled state under a case that a working power of the antenna is a first type of power, and the antenna switch being configured to select the second adjusting unit to be in the enabled state under a case that the working power of the antenna is a second type of power.

14. The antenna assembly of claim 11, wherein the first adjusting unit and the second adjusting unit are configured to adjust the radiation direction of the antenna by adjusting one or more antenna parameters of the antenna, the one or more antenna parameters comprise at least one of an antenna feed length and an antenna area.

15. The antenna assembly of claim 14, wherein the first adjusting unit comprises a first conductive wire electrically coupled to a first position of the antenna, the second adjusting unit comprises a second conductive wire electrically coupled to a second position of the antenna, and the antenna switch is coupled among the first conductive wire, the second conductive wire and ground, and configured to select one of the first conductive wire and the second conductive wire to be grounded, to change a grounding position of the antenna and thus further change the antenna feed length of the antenna.

16. The antenna assembly of claim 15, wherein the antenna switch comprises a single-pole double-throw switch, a static contact of the single-pole double-throw switch is grounded, a first movable contact of the single-pole double-throw switch is coupled to the first conductive wire, a second movable contact of the single-pole double-throw switch is coupled to the second conductive wire; the static contact of the single-pole double-throw switch is selected to be coupled to one of the first movable contact and the second movable contact, to select one of the first conductive wire and the second conductive wire to be grounded.

17. The antenna assembly of claim 15, wherein the antenna switch comprises a first single-pole single-throw switch and a second single-pole single-throw switch, and the first single-pole single-throw switch is coupled between the first conductive wire and the ground, and the second single-pole single-throw switch is coupled between the second conductive wire and the ground; one of the first single-pole single-throw switch and the second single-pole single-throw switch is turned on, to select one of the first conductive wire and the second conductive wire to be grounded.

18. The antenna assembly of claim 14, wherein the first adjusting unit comprises a first conductive wire electrically coupled to a first position of the antenna and a first conductive portion coupled to the first conductive wire, the second adjusting unit comprises a second conductive wire electrically coupled to a second position of the antenna and a second conductive portion coupled to the second conductive wire, an area of the first conductive portion is not equal to an area of the second conductive portion, the antenna switch is coupled among the first conductive wire, the second conductive wire, and ground, and configured to select one of the first conductive wire and the second conductive wire to be grounded, to change a grounding position of the antenna and thus further change the antenna feed length of the antenna, and to change an antenna area of the antenna based on the corresponding conductive portion coupled to the corresponding conductive wire.

19. A method for improving a radiation performance of an antenna, the method comprising:
   determine a type of a working power of the antenna; and
   adjusting a radiation direction of the antenna based on the type of the working power of the antenna, comprising:
      under a case that the working power of the antenna is a first type of power, adjusting the radiation direction of the antenna to a first radiation direction being an optimal radiation direction of the antenna; and
      under a case that the working power of the antenna is a second type of power, adjusting the radiation direction of the antenna to a second radiation direction deviating from a functional device provided in the optimal radiation direction of the antenna, wherein a power value of the first type of power is smaller than a power value of the second type of power.

* * * * *